US012601646B2

(12) United States Patent
Liu et al.

(10) Patent No.: US 12,601,646 B2
(45) Date of Patent: Apr. 14, 2026

(54) SIMULATED EGGSHELL PERFORATION TEST DEVICE

(71) Applicant: Tsinghua University, Beijing (CN)

(72) Inventors: Ying Liu, Beijing (CN); Mingyan Zhao, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 352 days.

(21) Appl. No.: 18/521,966

(22) Filed: Nov. 28, 2023

(65) Prior Publication Data

US 2025/0003817 A1 Jan. 2, 2025

(30) Foreign Application Priority Data

Jun. 27, 2023 (CN) .......................... 202310769958.6

(51) Int. Cl.
 *G01L 5/00* (2006.01)
(52) U.S. Cl.
 CPC .................................. *G01L 5/0028* (2013.01)
(58) Field of Classification Search
 None
 See application file for complete search history.

(56) References Cited

U.S. PATENT DOCUMENTS 3,948,765 A * 4/1976 Anschutz ............... A01K 43/00
 209/560
5,131,274 A * 7/1992 Schouenborg ......... A01K 43/00
 73/579

9,606,096 B2 * 3/2017 Van Wegen ............ G01N 21/55
2013/0283894 A1 * 10/2013 De Ketelaere ........... G01N 3/48
 73/78
2015/0226654 A1 * 8/2015 de Ketelaere .......... G01B 11/16
 702/43

FOREIGN PATENT DOCUMENTS

| CN | 105136572 A | 12/2015 |
| CN | 108956343 A | 12/2018 |
| CN | 110595927 A | 12/2019 |

* cited by examiner

*Primary Examiner* — Suman K Nath
(74) *Attorney, Agent, or Firm* — Davis Wright Tremaine LLP

(57) ABSTRACT

The present application provides a simulated eggshell perforation test device, which includes a simulated eggshell and a perforation device for perforating at a preset perforation position of the simulated eggshell. The simulated eggshell is an eggshell that is enlarged multiple times in proportion to an egg, thereby solving the problem that due to small size of the egg, the stress detector cannot be attached to a surface of the egg or has inaccurate detection data after attaching. The simulated eggshell is enlarged proportionally, its size is much larger than the egg, such that it is easier to attach the stress detector. After the stress detector is attached on the simulated eggshell, the perforation device is used to perforate the simulated eggshell. Based on the data detected by the stress detector, the most suitable perforation condition is figured out to reduce the occurrence of crack during eggshell perforation.

20 Claims, 8 Drawing Sheets

222

221

610

SIMULATED EGGSHELL PERFORATION TEST DEVICE

CROSS REFERENCE OF RELATED APPLICATIONS

The present application claims priority to Chinese Patent Application No. 202310769958.6, filed on Jun. 27, 2023, which is hereby incorporated by reference in its entirety.

TECHNICAL FIELD

Embodiments of the present application relate to the technical field of egg embryo perforation, in particular to a simulated eggshell perforation test device.

BACKGROUND

A large number of vaccines, such as human influenza vaccine (for example H1N1 influenza A vaccine), rabies vaccine, pediatric measles vaccine, mumps virus serum, influenza vaccine for injection in poultry (such as chickens, ducks, geese, etc.) (i.e., avian influenza vaccine), Newcastle disease vaccine, infectious bronchitis vaccine, etc., need to be cultured in a 9-day-old chicken embryo (fertilized eggs). The virus is inoculated in the 9-day-old chicken embryo as a culture medium, so as to be used for virus isolation, virus multiplication, virus virulence titration, neutralization test, antigen and vaccine production, and the like.

In related technologies, a process of cultivating a vaccine in a chicken embryo involves perforating an eggshell of a 9-day-old chicken embryo using an impact head with a diameter of 2 mm to 3 mm; injecting, by a needle, a virus strain into a living chicken embryo after completing the perforation; and then the virus strain growing inside the chicken embryo. However, during the process of perforating the eggshell with the impact head, a crack may occur in the eggshell, and an external bacterium may enter the chicken embryo through the crack, leading to cultivation failure (with a waste embryo rate of up to 4%-5%), and contamination of the same batch of viruses when collecting the allantoic fluid at a later stage, causing a huge economic loss.

There is currently no good solution to the problem of cracking prone to occur during perforation of an eggshell.

SUMMARY

Embodiments of the present application provide a simulated eggshell perforation test device to solve the technical problem that there is no good solution currently for the problem of cracking prone to occur during perforation of an eggshell.

The embodiments of the present application provide the following technical solution to solve the above technical problem.

The embodiments of the present application provide a simulated eggshell perforation test device, which includes:

a simulated eggshell where the simulated eggshell is an eggshell enlarged multiple times in proportion to an egg, and a stress detector is disposed on the simulated eggshell, and the stress detector is configured to detect stress at a preset stress detection position of the simulated eggshell; and a perforation device capable of perforation at a preset perforation position of the simulated eggshell.

The present application has beneficial effects as below: the simulated eggshell perforation test device provided by the embodiments of the present application includes a simulated eggshell and a perforation device for perforating at a preset perforation position of the simulated eggshell, where the simulated eggshell is an eggshell that is enlarged multiple times in proportion to an egg (such as a hen's egg), thereby solving the problem that due to small size of the egg, the stress detector cannot be attached to a surface of the egg or has inaccurate detection data after attaching. After the simulated eggshell is enlarged proportionally, its size is much larger than the egg, which is convenient for the attaching of the stress detector. After the stress detector is attached to the simulated eggshell, the perforation device is used to perforate the simulated eggshell. Based on the data detected by the stress detector, the most suitable perforation condition is figured out so as to reduce the occurrence of crack during eggshell perforation.

In one possible implementation, the perforation device includes a marble and a marble-launching mechanism, where the marble-launching mechanism launches the marble towards the preset perforation position of the simulated eggshell and causes the marble to perforate the simulated eggshell at the preset perforation position;

the simulated eggshell perforation test device further includes an eggshell bearing mechanism and a detection device;

the eggshell bearing mechanism includes a base, an egg tray, and an elastic member disposed between the base and the egg tray, where the egg tray is configured to hold the simulated eggshell;

the detection device includes a marble speed detection device and an elastic member compression detection device, and the marble speed detection device is configured to detect a launching speed of the marble, and the elastic member compression device is configured to detect a compression amount of the elastic member.

In one possible implementation, the marble-launching mechanism is a friction wheel launching device.

In one possible implementation, the elastic member is a spring.

In one possible implementation, the marble speed detection device is a first high-speed camera, and the elastic member compression detection device is a second high-speed camera.

In one possible implementation, the stress detector includes multiple strain gauges, and the strain gauges are each attached to different positions of the simulated eggshell.

In one possible implementation, the simulated eggshell includes an eggshell body and an eggshell cover, where a through-hole is disposed at a position of the eggshell body corresponding to an air chamber, and the eggshell cover is used for covering and filling the through-hole;

the preset perforation position is located on the eggshell cover.

In one possible implementation, the eggshell body is made of a plastic material, and the eggshell cover is made of quicklime and gelatin.

In one possible implementation, the through-hole includes a first hole section and a second hole section in communication with each other, where a circumferential side wall of the first hole section protrudes from a circumferential side wall of the second hole section to form a step structure within the through-hole, and the first hole section is located on a side near an interior of the eggshell body;

the eggshell cover has a first cover part and a second cover part in connection with each other, and a circumferential edge of the second cover part protrudes from a circumferential edge of the first cover part;

when the eggshell cover covers the through-hole, a circumferential side wall of the first cover part is fitted with the side wall of the first hole section, and a side of the step structure facing the second cover part is fitted with a side of the second cover part facing the step structure, and a circumferential side wall of the second cover part is fitted with the side wall of the second hole section.

In one possible implementation, the simulated eggshell perforation test device further includes an eggshell cover preparation mold, and the eggshell cover preparation mold is configured to prepare the eggshell cover with the quicklime and the gelatin.

In one possible implementation, the eggshell cover preparation mold includes an upper mold and a lower mold, and the upper mold and the lower mold are detachably connected;

the lower mold has a molding concave, and a bottom of the molding concave is a curved surface;

the upper mold has a molding convex and a side of the molding convex facing the lower mold has a recess for preparing the first cover part, and a bottom of the recess is provided with multiple overflow holes, and the molding convex may be placed in the molding concave, and the molding convex cooperates with the molding concave to prepare the eggshell cover, and excess preparation liquid poured into the molding concave flows out through the overflow holes.

In one possible implementation, the lower mold is disposed with a movable plug, and the movable plug penetrates into the bottom of the molding concave from a side of the lower mold, and the movable plug is configured to push the eggshell cover out of the molding concave after the eggshell cover has been shaped in the molding concave.

In one possible implementation, the upper mold is provided with an overflow groove, and the overflow groove and the molding convex are located on two opposite sides of the upper mold.

In one possible implementation, the lower mold has multiple limiting parts, and each of the limiting parts has a limiting groove, and a buckle is disposed in each limiting groove;

the upper mold has multiple limiting pillars, and the number of the limiting pillars is the same as the number of the limiting grooves, and the limiting pillars correspond to the limiting grooves one by one, and each of the limiting pillars is disposed with a buckle slot;

for the limiting pillars and corresponding limiting grooves, the limiting pillars slide into the limiting grooves, and the buckle is snap-fitted in the buckle slot to ensure that the upper mold is fixedly connected to the lower mold.

In one possible implementation, each of the limiting parts includes a fixing tab, as well as a first limiting part, a second limiting part, and a buckle part which are disposed on the fixing tab;

the fixing tab is connected to a side of the lower mold; the first limiting part and the second limiting part are opposite to each other, and both the first limiting part and the second limiting part are connected to a side of the lower mold;

the buckle part is disposed between the first limiting part and the second limiting part, and the buckle part is opposite to a side of the lower mold;

the first limiting part, the second limiting part, and the buckle part are enclosed to form the limiting groove, and a side of the buckle part facing the limiting groove is provided with a bulge, and the bulge is snap-fitted in the buckle slot.

In one possible implementation, a side of the buckle part facing away from the fixing tab is folded towards a side that is facing away from a side of the lower mold.

In one possible implementation, both a side of the first limiting part facing the second limiting part and a side of the second limiting part facing the first limiting part are provided with a chute;

the limiting pillar is provided with a sliding strip corresponding to the chute.

In addition to the technical problem solved by the present application, the technical features constituting the technical solution, and the beneficial effects brought by these technical features of the technical solution, other technical problem that can be solved by the simulated eggshell perforation test device provided by the present application, other technical features included in the technical solution, and beneficial effects brought by these technical features will be further described in detail in the specific implementation.

BRIEF DESCRIPTION OF DRAWINGS

In order to provide a clearer explanation of embodiments of the present application or the technical solution in the prior art, a brief introduction will be given to the accompanying drawings required in the description of the embodiments of the present application or the prior art. It is obvious that the accompanying drawings in the following description are only some of embodiments of the present application, and these drawings and textual descriptions are not intended to limit the scope of the concept of the present application in any way, but rather to explain the concept of the present application to those skilled in the art by reference to specific embodiments. For those of ordinary skill in the art, other drawings can also be obtained based on these drawings without creative labor.

DESCRIPTION FOR REFERENCE NUMERALS

Figure 1:
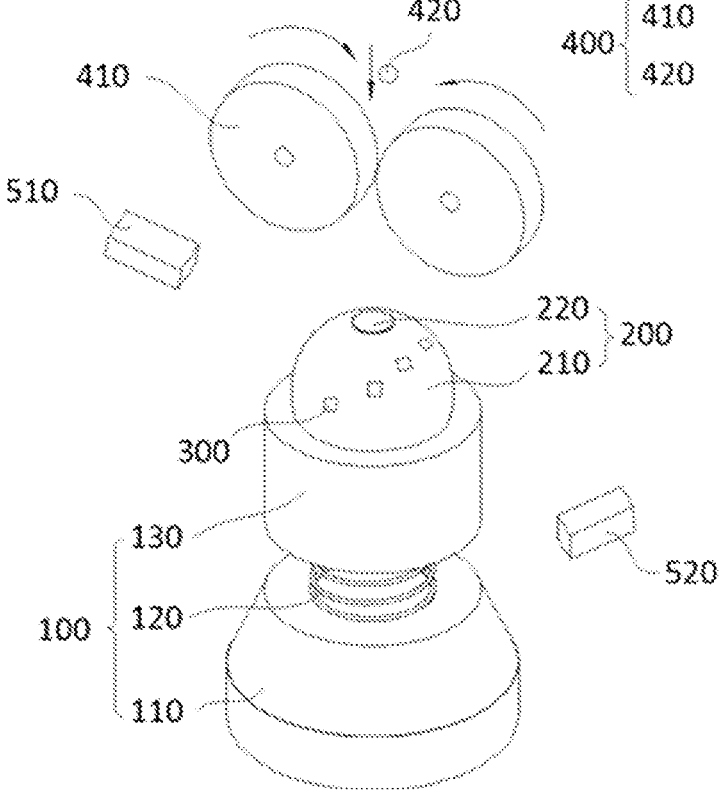
FIG. 1 is a schematic diagram of a simulated eggshell perforation test device in an embodiment of the present application.

100. Eggshell bearing mechanism;
110. Base; 120. Elastic member; 130. Egg tray;
200. Simulated eggshell;
210. Eggshell body; 220. Eggshell cover;
211. Through-hole;
2111. Second hole section; 2112. Step structure;
221. First cover part; 222. Second cover part;
300. Strain gauge;
400. Perforation device;
410. Marble-launching mechanism; 420. Marble;

510. First high-speed camera; 520. Second high-speed camera;

600. Eggshell cover preparation mold;

610. Lower mold; 620. Upper mold;

611. Molding concave; 612. Movable plug; 613. Limiting part;

6131. Fixing tab; 6132. First limiting part; 6133. Second limiting part; 6134. Buckle part;

61331. Chute;

621. Molding convex; 622. Limiting pillar; 623. Overflow groove;

6211. Recess;

6221. Buckle slot; 6222. Sliding strip.

DESCRIPTION OF EMBODIMENTS

In related technologies, a process of cultivating a vaccine in a chicken embryo involves perforating an eggshell of a 9-day-old chicken embryo using an impact head with a diameter of 2 mm to 3 mm; injecting, by a needle, a virus strain into a living chicken embryo after completing the perforation; and then the virus strain growing inside the chicken embryo. However, during the process of perforating the eggshell with the impact head, a crack may occur in the eggshell, and an external bacterium may enter the chicken embryo through the crack, leading to cultivation failure (with a waste embryo rate of up to 4%-5%), and contamination of the same batch of viruses when collecting the allantoic fluid at a later stage, causing a huge economic loss. There is currently no good solution to addressing the problem of cracking prone to occur during the perforation process of an eggshell. After research and analysis by the inventor, it is necessary to research the mechanical mechanism of the eggshell during perforation in order to reduce the occurrence of a crack. However, it is difficult to carry out such research because: firstly, the egg has a small size and the surface thereof is a curved surface with a small curvature radius, which makes it inconvenient to dispose a strain gauge (an element for detecting stress and stress change at a different position of the eggshell during perforation) on the eggshell; secondly, the eggshell has a wall thickness of only about 0.35 millimeters, which is particularly prone to be broken, and thus posing great difficulties for the research; thirdly, for a long time, the research on thin shell mechanics has focused on plastic material (metal, such as steel) and brittle material (such as ceramic), while a main component of the eggshell is calcium carbonate $(CaCO_3)$, which accounts for about 83%, and the rest about 17% is protein, and therefore, the eggshell is neither the plastic material nor equivalent to the brittle material; fourthly, the research on thin shell mechanics mainly focuses on flat plate, cambered surface, and hemisphere, while there are few related researches on a closed thin-walled spherical shell such as an egg.

In view of this, the embodiments of the present application conduct perforation tests by designing a scaled-up simulated eggshell and disposing stress detectors at different positions of the simulated eggshell. By detecting the stress and the stress change at the different positions of the simulated eggshell through the stress detectors, the stress characteristic of the eggshell is analyzed so as to reduce the occurrence of crack during perforation of the eggshell.

The following will provide a clear and complete description of the technical solution in the embodiments of the present application in conjunction with the accompanying drawings of the embodiments. Obviously, the described embodiments are only some of the embodiments of the present application, not all of them. Based on the embodiments in the present application, all other embodiments obtained by those of ordinary skill in this field without creative labor fall within the scope of protection in the present application.

As shown in FIG. 1, a simulated eggshell perforation test device provided in the embodiment includes a simulated eggshell 200 and a perforation device 400 that can perforate at a preset perforation position of the simulated eggshell 200. The simulated eggshell 200 is an eggshell that is enlarged multiple times in proportion to an egg (here the egg can be a hen's egg or another egg, such as a duck's egg). The simulated eggshell 200 is provided with a stress detector, and the stress detector is configured to detect the stress at a preset stress detection position of the simulated eggshell 200. The simulated eggshell 200, which is enlarged multiple times in proportion to an egg, solves the problem that due to small size of the egg, the stress detector cannot be attached to a surface of the egg or has inaccurate detection data after attaching. After the simulated eggshell 200 is enlarged proportionally, its size is much larger than the egg, which is convenient for the attaching of the stress detector. After the stress detector is attached to the simulated eggshell 200, the perforation device 400 is used to perforate the simulated eggshell 200. Based on the data detected by the stress detector, the most suitable perforation condition is figured out so as to reduce the occurrence of crack during eggshell perforation. For example, the occurrence of crack during the perforation of eggshell can be reduced by adjusting parameters of the perforation device 400 for the perforation of the simulated eggshell 200 (such as perforation speed, perforation size, etc.), using the stress detector to detect the stress and the stress change at the preset stress detection position, and then selecting corresponding parameters of the perforation device 400 when the stress at each position is relatively small during the perforation process, as the parameter of the perforation device 400 for the perforation of the simulated eggshell 200.

It is worth noting that the above simulated eggshell 200 can be enlarged multiple times in proportion to the egg, which includes being enlarged twice. In addition, it can also be enlarged non-integer times, for example, 2.5 times.

In an implementation, the preset perforation position is located at a part of the simulated eggshell 200 corresponding to an air chamber, and the preset stress detection position is positioned on a half of the simulated eggshell 200 near the air chamber.

In some embodiments of the present application, the stress detector includes multiple strain gauges 300, which are each attached to different positions of the simulated eggshell 200. That is, there are multiple preset stress detection positions, and each preset stress detection position is attached with one strain gauge 300. In an implementation, longitude lines and latitude lines are preset on the simulated eggshell, and the multiple preset stress detection positions are located at different longitudes and latitudes, or the multiple preset stress detection positions are located at a same latitude but at different longitudes.

In some embodiments of the present application, the perforation device 400 includes a marble 420 and a marble-launching mechanism 410. The marble-launching mechanism 410 launches the marble 420 towards the preset perforation position of the simulated eggshell 200 and causes the marble 420 to penetrate the simulated eggshell 200 at the preset perforation position. In an implementation, the marble-launching mechanism 410 is a friction wheel launching device, that is, the marble-launching mechanism 410 includes two friction wheels that rotate relative to each other to launch the marble 420 to the preset perforation position of the simulated eggshell 200 and cause the marble 420 to penetrate the simulated eggshell 200 at the preset perforation position.

As shown in FIG. 1, the simulated eggshell perforation test device further includes an eggshell bearing mechanism 100 and a detection device. The eggshell bearing mechanism 100 includes a base 110, an egg tray 130, and an elastic member 120 disposed between the base 110 and the egg tray 130. The egg tray 130 is configured to hold the simulated eggshell 200. In an implementation, the elastic member 120 is a spring. The detection device includes a marble speed detection device and an elastic member compression detection device, where the marble speed detection device is configured to detect a launching speed of the marble 420, and the elastic member compression detection device is configured to detect a compression amount of the elastic member 120. In an implementation, the marble speed detection device is a first high-speed camera 510, and the elastic member compression detection device is a second high-speed camera 520.

In the embodiment of the present application, the most suitable launching parameter of the marble 420 is obtained by adjusting launching parameters of the marble 420 (including a launching speed of the marble 420, as well as the size, weight, shape of the marble 420, etc.), recording the stress and the stress change detected by the stress detector at the preset stress detection position under different launching parameters of the marble 420, and analyzing the stress situation at different positions of the simulated eggshell 200. The most suitable launching parameter of the marble 420 is such launching parameter of the marble 420 that minimizes damage to the simulated eggshell 200 and has relatively small stress at each position during the process of the marble 420 penetrating the simulated eggshell 200. Using such parameter for egg perforation can reduce the occurrence of crack.

The simulated eggshell perforation test device provided in the embodiments of the present application can be used for several researches as described below:

First is to research the energy absorbed by the simulated eggshell 200. The arrangement of the elastic member 120 mentioned above is used to calculate the energy absorbed by the simulated eggshell 200. Specifically, a liquid is injected into the simulated eggshell 200, the marble-launching mechanism 410 launches the marble 420 toward the simulated eggshell 200, the launching speed of the marble 420 is calculated based on the data detected by the marble speed detection device, and then kinetic energy A of the marble 420 is calculated, the compression amount of the elastic member 120 is calculated based on the data detected by the elastic member compression detection device, and then compression potential energy B of the elastic member 120 is calculated, and a difference between the kinetic energy A and the compression potential energy B of the elastic member 120 is the energy absorbed by the simulated eggshell 200. The launching parameter of the marble 420 is changed while keeping the amount of the content in the simulated eggshell 200 unchanged, to research the magnitude of energy absorbed by the simulated eggshell 200 under different launching parameters of the marble 420, as well as the stress change at each preset stress detection position of the simulated eggshell 200.

Second is based on the fact that different day-old chicken embryos have different amounts of the contents and different amounts of the contents affect the occurrence of crack on the eggshell, the simulated eggshell perforation test device can be used to research an effect of the amount of the content (liquid injected into the simulated eggshell 200) on the stresses at different positions of the simulated eggshell 200 when the marble-launching mechanism 410 launches the marble 420 toward the simulated eggshell 200 and penetrates the simulated eggshell 200. That is to say, the energy absorbed by the simulated eggshell 200 and the stress detected by each strain gauge 300 are recorded when the launching parameter of the marble 420 remains unchanged and the amount of the content changes, so as to analyze the stress change at each preset stress detection position of the simulated eggshell 200 when the amount of the content changes.

Third is to research the stress change at each preset stress detection position of the simulated eggshell 200 and the energy absorbed by the simulated eggshell 200 when both the amount of the content and the launching parameter of the marble 420 change.

With the researches on the above three aspects, the mechanical mechanism during eggshell perforation can be obtained, thereby reducing the occurrence of crack during eggshell perforation. That is to say, by the above researches, it is possible to obtain such launching parameter of the marble 420 that under a certain amount of the content (such as an amount corresponding to that of the content in a 6-day-old chicken embryo, or an amount corresponding to that of the content in a 9-day-old chicken embryo, etc.), the stress change detected by each strain gauge is relatively small and the marble 420 can better penetrate the simulated eggshell 200. Using such launching parameter of the marble 420 to perforate the eggshell can reduce the occurrence of crack during eggshell perforation.

Figure 2:
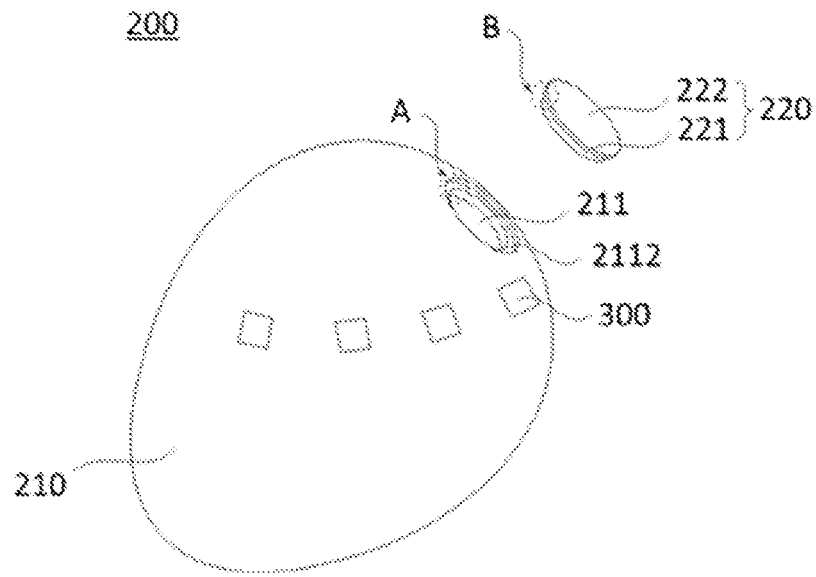
FIG. 2 is a schematic diagram of a simulated eggshell.

As shown in FIG. 1 and FIG. 2, in order to facilitate the injection of liquid into the simulated eggshell 200 and reduce the application cost of the simulated eggshell perforation test device, the simulated eggshell 200 includes an eggshell body 210 and an eggshell cover 220. A through-hole 211 is disposed at a position of the eggshell body 210 corresponding to an air chamber, and the eggshell cover 220 is used for covering and filling the through-hole 211, and the preset perforation position is located on the eggshell cover 220. That is to say, the simulated eggshell 200 can be covered by the eggshell cover 220 after the eggshell body 210 is injected with a liquid. This setting facilitates the injection of liquid into the simulated eggshell 200. In addition, the preset perforation position is located on the eggshell cover 220, that is, the position where the marble 420 penetrates the simulated eggshell 200 is located on the eggshell cover 220. Since the eggshell cover 220 is inevitably damaged when the marble 420 penetrates the simulated eggshell 200, while the eggshell body 210 is not necessarily be damaged, only the eggshell cover 220 needs to be replaced when the eggshell body 210 is not damaged in the process of constantly repeating the test, which reduces the application cost of the simulated eggshell perforation test device and simplify the process of repeatedly attaching the strain gauges 300, such that the test results are more accurate.

It is noted that the liquid injected into the eggshell body 210 can be water or a liquid with similar viscosity to the content of the egg.

In some embodiments of the present application, the eggshell body 210 is made of a plastic material, and the eggshell cover 220 is made of quicklime and gelatin. The eggshell cover 220 is made by simulating the composition of the eggshell and is used for being penetrated by the marble 420. The eggshell body 210 can be made of the plastic material as it is merely used for researching the stress change. The eggshell body 210 made of the plastic material is not easily damaged, which can reduce the application cost of the simulated eggshell perforation test device and eliminate the need to repeatedly attach the strain gauges 300, resulting in more accurate test results. In an implementation, the eggshell body 210 is printed by a 3D printing device, and has a shape consistent with an egg and is enlarged in proportion to a real egg, and a thickness of the eggshell body 210 does not exceed 1 millimeter.

In the embodiments of the present application, the gelatin component in the eggshell cover 220 is used to simulate the protein in a real eggshell.

Figure 3:
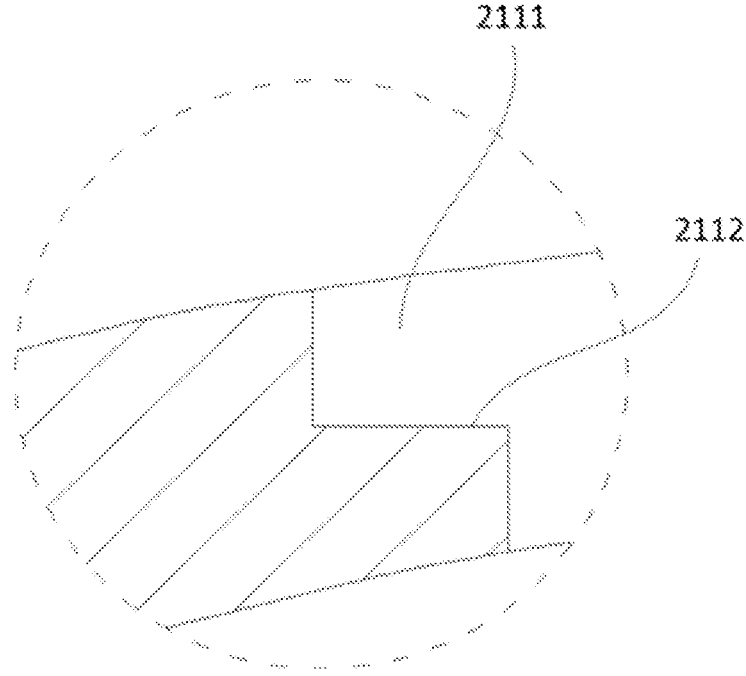
FIG. 3 shows a partial cross-sectional view taken along A in FIG. 2.

As shown in FIG. 2 and FIG. 3, the through-hole 211 includes a first hole section and a second hole section 2111 in communication with each other. A circumferential side wall of the first hole section protrudes from a circumferential side wall of the second hole section 2111 to form a step structure 2112 within the through-hole 211. The first hole section is located on a side near the interior of the eggshell body 210. That is to say, a radial size of the first hole section is smaller than a radial size of the second hole section 2111.

Figure 4:
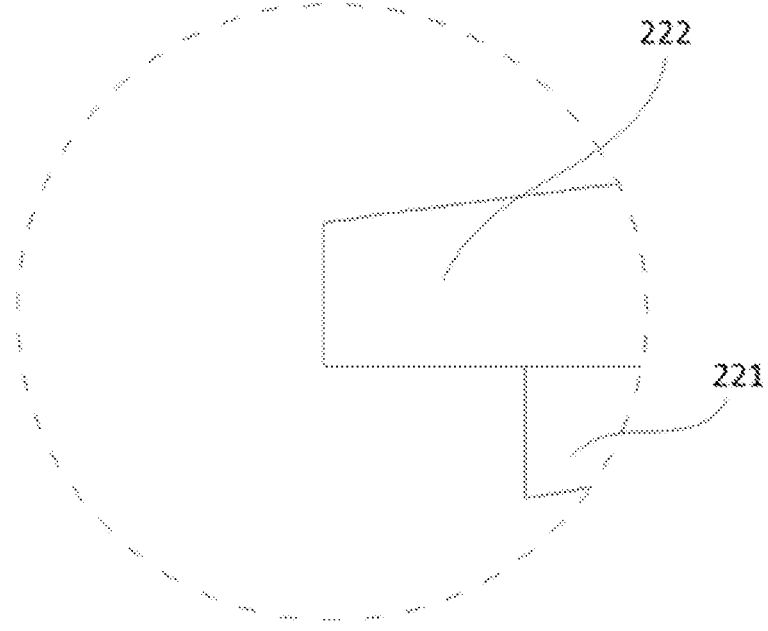
FIG. 4 shows a partial cross-sectional view taken along B in FIG. 2.
Figure 5:
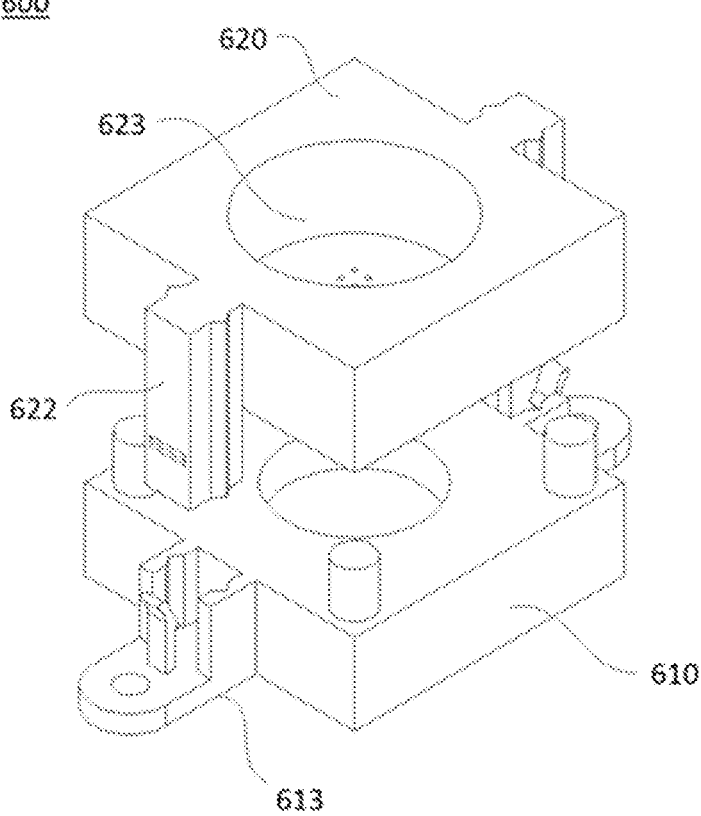
FIG. 5 is a schematic structural diagram of an eggshell cover preparation mold.

As shown in FIG. 2 and FIG. 4, the eggshell cover 220 has a first cover part 221 and a second cover part 222 in connection with each other, and a circumferential edge of the second cover part 222 protrudes from a circumferential edge of the first cover part 221. When the eggshell cover 220 covers the through-hole 211, a circumferential side wall of the first cover part 221 is fitted with the side wall of the first hole section, and a side of the step structure 2112 facing the second cover part 222 is fitted with a side of the second cover part facing the step structure 2112, and a circumferential side wall of the second cover part is fitted with the side wall of the second hole section 2111. That is to say, the eggshell cover 220 completely fills the through-hole 211.

The simulated eggshell perforation test device according to the embodiment of the present application needs to damage one eggshell cover 220 during each test, so the eggshell cover 220 is a consumable. Therefore, the simulated eggshell perforation test device also includes an eggshell cover preparation mold 600, which is configured to prepare the eggshell cover 220 by quicklime and gelatin.

In some embodiments of the present application, as shown in FIGS. 5, 6, 7 and 8, the eggshell cover preparation mold 600 includes an upper mold 620 and a lower mold 610, and the upper mold 620 and the lower mold 610 can be detachably connected. The lower mold 610 has a molding concave 611, and a bottom of the molding concave 611 (a side opposite to an opening of the molding concave 611) is a curved surface that matches a curved surface of an outer side surface of the eggshell cover 220. The upper mold 620 has a molding convex 621, which is placed in the molding concave 611, and the molding convex 621 cooperates with the molding concave 611 to prepare the eggshell cover 220. A side of the molding convex 621 facing the lower mold 610 has a recess 6211 for preparing the first cover part 221, and the provision of the recess 6211 causes the eggshell cover 220 to form the first cover part 221. At the bottom of the recess 6211 (a side opposite to an opening of the recess 6211), there are multiple overflow holes. The overflow holes are used to enable excess preparation liquid in the molding concave 611 to flow out of the overflow holes when the eggshell cover 220 is prepared by pouring a liquid for preparing the eggshell cover 220 into the molding concave 611 and placing the molding convex 621 into the molding concave 611.

Figure 6:
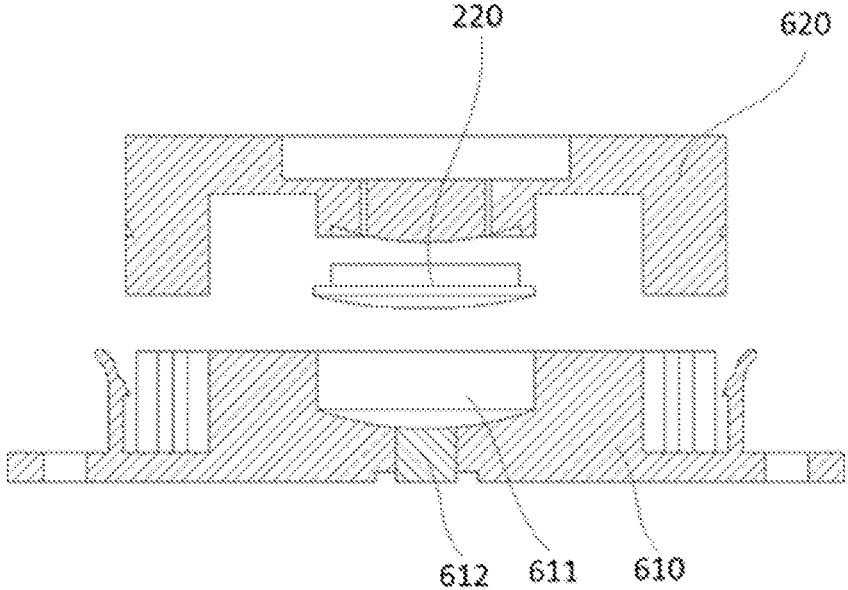
FIG. 6 shows a cross-sectional view of the eggshell cover preparation mold.
Figure 7:
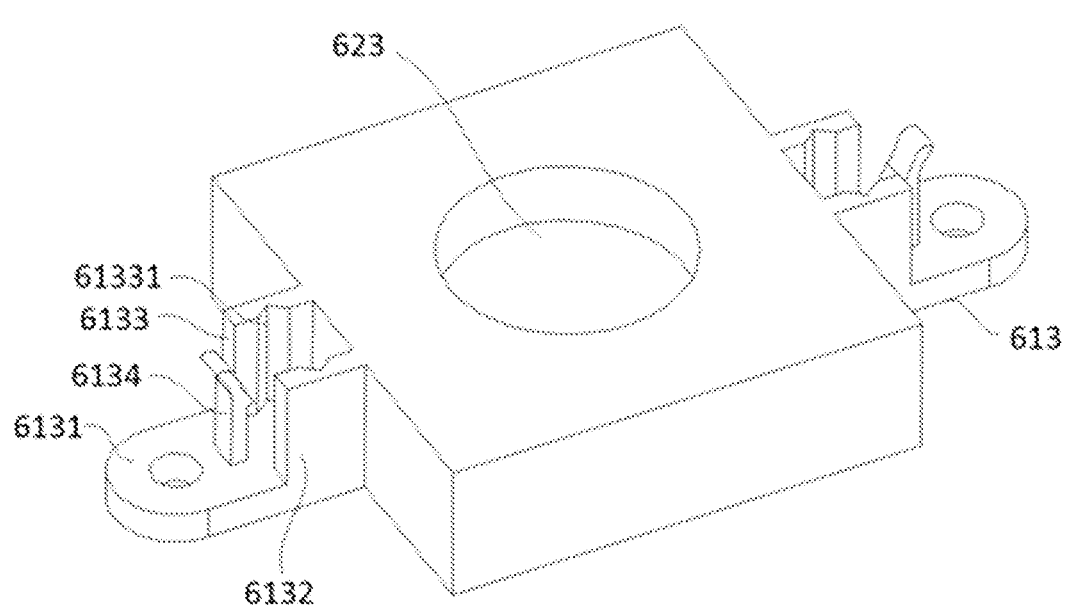
FIG. 7 is a schematic diagram of a lower mold.
Figure 8:
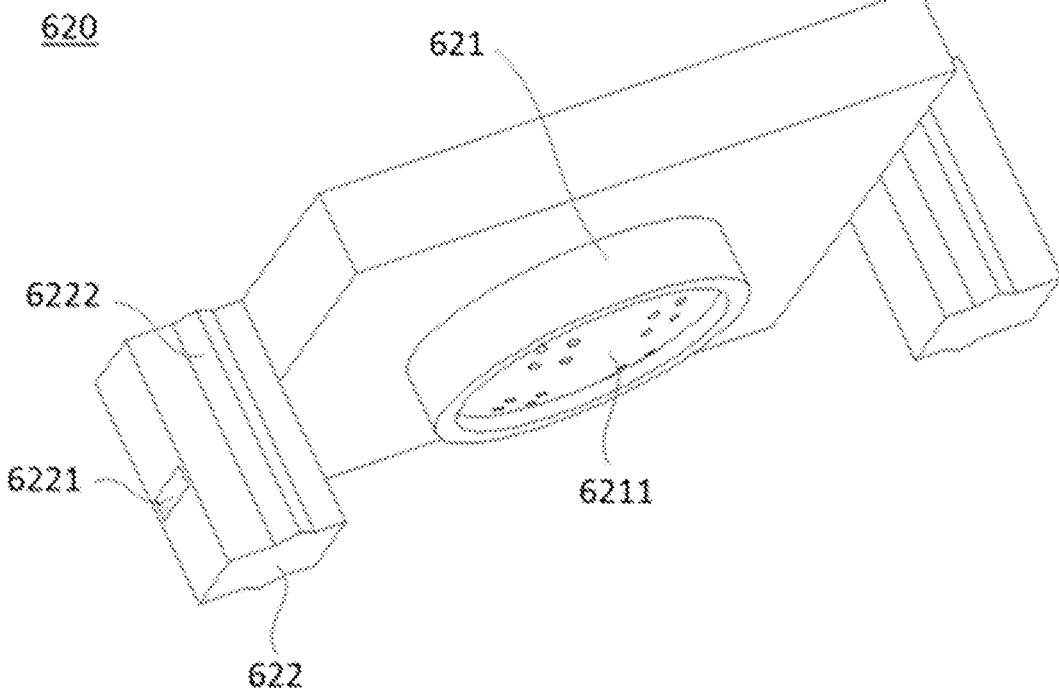
FIG. 8 is a schematic diagram of an upper mold.

As shown in FIG. 6, in order to facilitate demolding of a molded eggshell cover 220, the lower mold 610 is disposed with a movable plug 612, which penetrates into the bottom of the molding concave 611 from one side of the lower mold 610. The movable plug 612 is configured to push the eggshell cover 220 out of the molding concave 611 after the eggshell cover 220 has been shaped in the molding concave 611.

In order to prevent the liquid overflown from the overflow hole from flowing everywhere, the upper mold 620 is disposed with an overflow groove 623. The overflow groove 623 and the molding convex 621 are located on two opposite sides of the upper mold 620.

In some embodiments of the present application, the lower mold 610 has multiple limiting parts 613, each of which has a limiting groove, and each limiting groove is provided with a buckle. The upper mold 620 has multiple limiting pillars 622, and the number of the limiting pillars 622 is the same as the number of the limiting grooves and both of them are in one-to-one correspondence. Each limiting pillar 622 is provided with a buckle slot 6221. For a limiting pillar 622 and a corresponding limiting groove, the limiting pillar 622 slides into the limiting groove, and the buckle is snapped in the buckle slot 6221, so that the upper mold 620 is fixedly connected to the lower mold 610. That is to say, the upper mold 620 and the lower mold 610 are engaged through the cooperation of the limiting pillar 622 and the limiting groove. Such connection facilitates the connection between the upper mold 620 and the lower mold 610, and the cooperation of the buckle and the buckle slot 6221 makes that there is no relative movement between the upper mold 620 and the lower mold 610 after the upper mold 620 is mounted to the lower mold 610, which results in better molding of the eggshell cover 220.

In order to facilitate the disassembly of the upper mold 620, each limiting part 613 includes a fixing tab 6131, as well as a first limiting part 6132, a second limiting part 6133 and a buckle part 6134 which are disposed on the fixing tab 6131. The fixing tab 6131 is connected to a side of the lower mold 610, and the first limiting part 6132 and the second limiting part 6133 are opposite to each other, and both the first limiting part 6132 and the second limiting part 6133 are connected to a side of the lower mold 610. The buckle part 6134 is disposed between the first limiting part 6132 and the second limiting part 6133, and the buckle part 6134 is opposite to a side of the lower mold 610. The first limiting part 6132, the second limiting part 6133, and the buckle part 6134 are enclosed to form a limiting groove. A side of the buckle part 6134 facing the limiting groove is provided with a bulge, and the bulge is snap-fitted in the buckle slot 6221. The buckle part 6134 is separately disposed to facilitate the sliding-in of the limiting pillar 622. The buckle part 6134 can be moved when the upper mold 620 is disassembled so as to remove the bulge out of the buckle slot 6221, thereby facilitating the disassembly of the upper mold 620.

In order to facilitate the movement of the buckle part 6134, a side of the buckle part 6134 facing away from the fixing tab 6131 is folded towards a side that is facing away from a side of the lower mold 610.

In order to enable the accurate mounting of the upper mold 620 on the lower mold 610, both a side of the first limiting part 6132 facing the second limiting part 6133 and a side of the second limiting part 6133 facing the first limiting part 6132 are provided with a chute 61331. The limiting pillar 622 is provided with a sliding strip 6222 corresponding to the chute 61331, and the sliding strip cooperates with the chute 61331 to ensure the accurate mounting of the upper mold 620 to the lower mold 610.

In the embodiment of the present application, when the eggshell cover preparation mold 600 is used to prepare the eggshell cover 220, a quicklime (CaO) powder is firstly mixed evenly with a gelatin powder, and then distilled water is added thereto. After stirring, the quicklime reacts with water to form calcium hydroxide. The stirred mixture is poured into the molding concave 611 of the lower mold 610, and then the upper mold 620 is mounted to the lower mold 610. The excess preparation liquid flows out through the overflow hole. The calcium hydroxide in the preparation liquid reacts with carbon dioxide in air to form calcium carbonate. When the preparation liquid in the molding concave 611 solidifies, hardens, and becomes dry, the upper mold 620 is separated from the lower mold 610, and the movable plug 612 is pushed to push out the molded eggshell cover 220.

The terms "above", "below", etc. are used to describe relative positional relationships of various structures in the accompanying drawings, only for the sake of clarity in description, and not to limit the scope of implementation of the present application. Changes or adjustments in their relative relationships, without substantial technical changes, shall also be considered as falling into the scope of implementation of the present application.

It is noted that in the present application, unless otherwise specified and limited, a first feature being above or below a second feature may be that the first feature is in direct contact with the second feature, or the first and second features is in indirect contact through an intermediate medium. Moreover, the first feature being "above", "over" and "on" the second feature may be that the first feature is directly or diagonally above the second feature, or it simply indicates that a horizontal height of the first feature is higher than that of the second feature. The first feature being "below", "beneath" and "under" the second feature may be that the first feature is directly or diagonally below the second feature, or it simply indicates that the horizontal height of the first feature is less than that of the second feature.

In addition, in the present application, unless otherwise specified and limited, the terms "mounting", "interconnect", "connect", "fixing" and the like should be broadly understood. For example, it may indicate a fixed connection, a detachable connection, or an integrated connection; and it may indicate a directly connection or indirect connection through an intermediate medium; and it may indicate internal communication between two elements or an interaction relationship between two elements. For an ordinary skilled in the art, the specific meanings of the above terms in the present application can be understood based on a specific circumstance.

In the description of this specification, the description related to the reference to term "an embodiment", "some embodiments", "illustrative embodiment", "example", "specific example", or "some examples" and the like are intended to refer to that a specific feature, structure, material, or feature described in conjunction with the embodiment(s) or example(s) are included in at least one embodiment or example of the present disclosure. In this specification, the schematic expressions of the above terms do not necessarily refer to the same embodiment or example. Moreover, the specific feature, structure, material, or feature described can be combined in an appropriate manner in any one or more of the embodiments or examples.

Finally, it is noted that the above embodiments are only used to illustrate the technical solution of the present application and not to limit it. Although the present application has been described in detail with reference to the aforementioned embodiments, those ordinary skilled in the art should understand that they can still modify the technical solution recorded in the aforementioned embodiment, or equivalently replace some or all of the technical features therein; and these modifications or replacements do not make the essence of corresponding technical solutions deviate from the scope of the technical solutions of the various embodiments of the present application.

What is claimed is:

1. A simulated eggshell perforation test device, comprising:
  a simulated eggshell, wherein the simulated eggshell is an eggshell enlarged multiple times in proportion to an egg, and a stress detector is disposed on the simulated eggshell, and the stress detector is configured to detect a stress at a preset stress detection position of the simulated eggshell; and
  a perforation device, capable of perforation at a preset perforation position of the simulated eggshell.

2. The simulated eggshell perforation test device according to claim 1, wherein the perforation device comprises a marble and a marble-launching mechanism, wherein the marble-launching mechanism launches the marble towards the preset perforation position of the simulated eggshell and causes the marble to penetrate the simulated eggshell at the preset perforation position;
  the simulated eggshell perforation test device further comprises an eggshell bearing mechanism and a detection device;
  the eggshell bearing mechanism comprises a base, an egg tray, and an elastic member disposed between the base and the egg tray, wherein the egg tray is configured to hold the simulated eggshell;
  the detection device comprises a marble speed detection device and an elastic member compression detection device, and the marble speed detection device is configured to detect a launching speed of the marble, and the elastic member compression detection device is configured to detect a compression amount of the elastic member.

3. The simulated eggshell perforation test device according to claim 2, wherein the simulated eggshell comprises an eggshell body and an eggshell cover, a through-hole is disposed at a position of the eggshell body corresponding to an air chamber, and the eggshell cover is used for covering and filling the through-hole;
  the preset perforation position is located on the eggshell cover.

4. The simulated eggshell perforation test device according to claim 3, wherein the eggshell body is made of a plastic material, and the eggshell cover is made of quicklime and gelatin.

5. The simulated eggshell perforation test device according to claim 4, wherein the through-hole comprises a first hole section and a second hole section in communication with each other, wherein a circumferential side wall of the first hole section protrudes from a circumferential side wall of the second hole section to form a step structure within the through-hole, and the first hole section is located on a side near an interior of the eggshell body;
  the eggshell cover has a first cover part and a second cover part in connection with each other, and a circumferential edge of the second cover part protrudes from a circumferential edge of the first cover part;

when the eggshell cover covers the through-hole, a circumferential side wall of the first cover part is fitted with the circumferential side wall of the first hole section, and a side of the step structure facing the second cover part is fitted with a side of the second cover part facing the step structure, and a circumferential side wall of the second cover part is fitted with the circumferential side wall of the second hole section.

6. The simulated eggshell perforation test device according to claim 5, wherein the simulated eggshell perforation test device further comprises an eggshell cover preparation mold, and the eggshell cover preparation mold is configured to prepare the eggshell cover by the quicklime and the gelatin.

7. The simulated eggshell perforation test device according to claim 6, wherein the eggshell cover preparation mold comprises an upper mold and a lower mold, and the upper mold and the lower mold are detachably connected to each other;

the lower mold has a molding concave, and a bottom of the molding concave is a curved surface;

the upper mold has a molding convex and a side of the molding convex facing the lower mold has a recess for preparing the first cover part, a bottom of the recess is provided with multiple overflow holes, the molding convex is placed in the molding concave, and the molding convex cooperates with the molding concave to prepare the eggshell cover, and an excess preparation liquid poured into the molding concave flows out through the overflow holes.

8. The simulated eggshell perforation test device according to claim 1, wherein the stress detector comprises multiple strain gauges, which are each attached to different positions of the simulated eggshell.

9. The simulated eggshell perforation test device according to claim 8, wherein the simulated eggshell comprises an eggshell body and an eggshell cover, a through-hole is disposed at a position of the eggshell body corresponding to an air chamber, and the eggshell cover is used for covering and filling the through-hole;

the preset perforation position is located on the eggshell cover.

10. The simulated eggshell perforation test device according to claim 9, wherein the eggshell body is made of a plastic material, and the eggshell cover is made of quicklime and gelatin.

11. The simulated eggshell perforation test device according to claim 10, wherein the through-hole comprises a first hole section and a second hole section in communication with each other, wherein a circumferential side wall of the first hole section protrudes from a circumferential side wall of the second hole section to form a step structure within the through-hole, and the first hole section is located on a side near an interior of the eggshell body;

the eggshell cover has a first cover part and a second cover part in connection with each other, and a circumferential edge of the second cover part protrudes from a circumferential edge of the first cover part;

when the eggshell cover covers the through-hole, a circumferential side wall of the first cover part is fitted with the circumferential side wall of the first hole section, and a side of the step structure facing the second cover part is fitted with a side of the second cover part facing the step structure, and a circumferential side wall of the second cover part is fitted with the circumferential side wall of the second hole section.

12. The simulated eggshell perforation test device according to claim 11, wherein the simulated eggshell perforation test device further comprises an eggshell cover preparation mold, and the eggshell cover preparation mold is configured to prepare the eggshell cover by the quicklime and the gelatin.

13. The simulated eggshell perforation test device according to claim 12, wherein the eggshell cover preparation mold comprises an upper mold and a lower mold, and the upper mold and the lower mold are detachably connected to each other;

the lower mold has a molding concave, and a bottom of the molding concave is a curved surface;

the upper mold has a molding convex and a side of the molding convex facing the lower mold has a recess for preparing the first cover part, a bottom of the recess is provided with multiple overflow holes, the molding convex is placed in the molding concave, and the molding convex cooperates with the molding concave to prepare the eggshell cover, and an excess preparation liquid poured into the molding concave flows out through the overflow holes.

14. The simulated eggshell perforation test device according to claim 1, wherein the simulated eggshell comprises an eggshell body and an eggshell cover, a through-hole is disposed at a position of the eggshell body corresponding to an air chamber, and the eggshell cover is used for covering and filling the through-hole;

the preset perforation position is located on the eggshell cover.

15. The simulated eggshell perforation test device according to claim 14, wherein the eggshell body is made of a plastic material, and the eggshell cover is made of quicklime and gelatin.

16. The simulated eggshell perforation test device according to claim 15, wherein the through-hole comprises a first hole section and a second hole section in communication with each other, wherein a circumferential side wall of the first hole section protrudes from a circumferential side wall of the second hole section to form a step structure within the through-hole, and the first hole section is located on a side near an interior of the eggshell body;

the eggshell cover has a first cover part and a second cover part in connection with each other, and a circumferential edge of the second cover part protrudes from a circumferential edge of the first cover part;

when the eggshell cover covers the through-hole, a circumferential side wall of the first cover part is fitted with the circumferential side wall of the first hole section, and a side of the step structure facing the second cover part is fitted with a side of the second cover part facing the step structure, and a circumferential side wall of the second cover part is fitted with the circumferential side wall of the second hole section.

17. The simulated eggshell perforation test device according to claim 16, wherein the simulated eggshell perforation test device further comprises an eggshell cover preparation mold, and the eggshell cover preparation mold is configured to prepare the eggshell cover by the quicklime and the gelatin.

18. The simulated eggshell perforation test device according to claim 17, wherein the eggshell cover preparation mold comprises an upper mold and a lower mold, and the upper mold and the lower mold are detachably connected to each other;

the lower mold has a molding concave, and a bottom of the molding concave is a curved surface;

the upper mold has a molding convex and a side of the molding convex facing the lower mold has a recess for preparing the first cover part, a bottom of the recess is provided with multiple overflow holes, the molding convex is placed in the molding concave, and the molding convex cooperates with the molding concave to prepare the eggshell cover, and an excess preparation liquid poured into the molding concave flows out through the overflow holes.

19. The simulated eggshell perforation test device according to claim 18, wherein the lower mold is disposed with a movable plug, the movable plug penetrates into the bottom of the molding concave from a side of the lower mold, and the movable plug is configured to push the eggshell cover out of the molding concave after the eggshell cover has been molded in the molding concave.

20. The simulated eggshell perforation test device according to claim 18, wherein the lower mold has multiple limiting parts, and each of the limiting parts has a limiting groove, and each limiting groove is provided with a buckle;

the upper mold has multiple limiting pillars, and the number of the limiting pillars is the same as the number of the limiting grooves, and the limiting pillars correspond to the limiting grooves one by one, and each of the limiting pillars is provided with a buckle slot;

for the limiting pillars and corresponding limiting grooves, the limiting pillars slide into the limiting grooves, and the buckle is snap-fitted in the buckle slot so that the upper mold is fixedly connected to the lower mold.

\* \* \* \* \*